United States Patent …
Gnielka

(10) Patent No.: US 10,077,010 B2
(45) Date of Patent: Sep. 18, 2018

(54) ARRANGEMENT FOR OPENING AND CLOSING AN OPENING IN AN INTERIOR TRIM PIECE OF A VEHICLE

(71) Applicant: Volkswagen Aktiengesellschaft, Wolfsburg (DE)

(72) Inventor: Eckart Gnielka, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 51 days.

(21) Appl. No.: 15/396,994

(22) Filed: Jan. 3, 2017

(65) Prior Publication Data

US 2017/0113631 A1    Apr. 27, 2017

Related U.S. Application Data

(63) Continuation of application No. PCT/EP2015/059993, filed on May 6, 2015.

(30) Foreign Application Priority Data

Jul. 2, 2014   (DE) .................. 10 2014 212 793

(51) Int. Cl.
    *B62D 25/14*       (2006.01)
    *B60R 13/02*       (2006.01)
    (Continued)

(52) U.S. Cl.
    CPC .......... *B60R 13/0275* (2013.01); *B60K 35/00* (2013.01); *B60K 37/04* (2013.01);
    (Continued)

(58) Field of Classification Search
    CPC ............. B60R 13/0275; B60R 11/0229; B60R 13/0237; B60R 13/0256; B60R 13/0262;
    (Continued)

(56) References Cited

U.S. PATENT DOCUMENTS

| 6,012,785 | A  | 1/2000 | Kawasaki |
| 6,542,305 | B2 | 4/2003 | Nakamura et al. |
| 7,063,225 | B2 | 6/2006 | Fukuo |
| 8,727,413 | B2 | 5/2014 | Seiller et al. |
| 8,953,247 | B2 | 2/2015 | Rumpf et al. |

(Continued)

FOREIGN PATENT DOCUMENTS

| CN | 202141855 U | 2/2012 |
| CN | 102608761 A | 7/2012 |

(Continued)

*Primary Examiner* — Lori L Lyjak
(74) *Attorney, Agent, or Firm* — Muncy, Geissler, Olds & Lowe, P.C.

(57) ABSTRACT

An arrangement for opening and closing an opening in a covering surface of an interior trim piece in a vehicle that includes an adjustable cover element in the form of a flat element. The cover element is movably mounted on a frame element that is connected to the interior trim piece. A rotational or pivoting movement of two pivoted levers that are pivotably mounted in bearing cheeks of the frame element is converted into a translational movement of the cover element. The cover element is urged into a defined path by a shaft penetrating bearing blocks of the cover element and by two toothed wheels which are located at the free ends of the shaft and each of which meshes with a first rack located on the bearing cheek.

10 Claims, 6 Drawing Sheets

(51) Int. Cl.
*B60K 35/00* (2006.01)
*B60K 37/04* (2006.01)
*B60R 11/02* (2006.01)
*B60R 11/00* (2006.01)
*G02B 27/01* (2006.01)

(52) U.S. Cl.
CPC ...... *B60R 11/0229* (2013.01); *B60R 13/0237* (2013.01); *B60R 13/0256* (2013.01); *B60R 13/0262* (2013.01); *B60K 2350/1092* (2013.01); *B60K 2350/405* (2013.01); *B60K 2350/406* (2013.01); *B60R 2011/0005* (2013.01); *B60R 2011/0094* (2013.01); *G02B 27/0149* (2013.01); *G02B 2027/0169* (2013.01); *Y02T 10/84* (2013.01)

(58) Field of Classification Search
CPC .... B60R 2011/0005; B60R 2011/0094; B60K 35/00; B60K 2350/406
See application file for complete search history.

(56) References Cited

U.S. PATENT DOCUMENTS

| | | |
|---|---|---|
| 2006/0012202 A1 | 1/2006 | Sakakibara et al. |
| 2016/0159258 A1* | 6/2016 | Simon ................. B60R 7/04 296/1.09 |

FOREIGN PATENT DOCUMENTS

| | | | |
|---|---|---|---|
| DE | 195 10 749 C1 | 4/1996 | |
| DE | 198 04 743 A1 | 8/1998 | |
| DE | 102 20 180 A1 | 11/2002 | |
| DE | 102 49 658 A1 | 5/2003 | |
| DE | 103 02 478 A1 | 8/2004 | |
| DE | 10325237 A1 * | 12/2004 | ............ A62C 2/18 |
| DE | 102 25 089 B4 | 5/2006 | |
| DE | 10 2008 019 867 B4 | 11/2009 | |
| JP | 2013-203376 A | 10/2013 | |
| KR | 10-2009-0059097 A | 6/2009 | |
| KR | 10-1329287 B1 | 11/2013 | |

\* cited by examiner

ARRANGEMENT FOR OPENING AND CLOSING AN OPENING IN AN INTERIOR TRIM PIECE OF A VEHICLE

This nonprovisional application is a continuation of International Application No. PCT/EP2015/059993, which was filed on May 6, 2015, and which claims priority to German Patent Application No. 10 2014 212 793.9, which was filed in Germany on Jul. 2, 2014, and which are both herein incorporated by reference.

BACKGROUND OF THE INVENTION

Field of the Invention

The invention relates to an arrangement for opening and closing an opening in an interior trim piece of a vehicle, in particular a motor vehicle.

Description of the Background Art

Known from DE 198 04 743 A1, which corresponds to U.S. Pat. No. 6,012,785, are raising mechanisms for a vehicle display device arranged in a dashboard, such as a navigation system, a television, or the like. Thus, according to a first embodiment, the display device is movably guided by means of pins located at one end in so-called cam grooves of a housing. When the pins are moved back and forth along the cam grooves, the display device can be displaced between a horizontal and an upright or raised position, in the raised position passing through an opening in the housing that can be closed by means of a pivoting cover. The cover is opened by means of the display device during the opening process. The pins are intended to be coupled to a motor through a gear rack mechanism. A rotary motion of the motor is intended to be converted into a straight-line back-and-forth motion by the gear rack mechanism so that the pins can slide. This document is silent as to how the gear rack mechanism is designed in detail. According to a second embodiment of the display device, provision is made that the display device is likewise movably guided by pins arranged at one end in cam grooves and in this way can be folded up or down. In this design, the base of a housing accommodating the display device is provided with a right-hand and a left-hand gear rack on which a motor-driven block can be moved along the gear racks by means of a left and a right gear. The motor is located in the block. The pins of the display device are guided both in cam grooves of the block and in cam grooves of the housing in such a manner that the display device is raised or stowed as a result of a motion of the block and with the aid of connecting links.

DE 102 20 180 A1, which corresponds to U.S. Pat. No. 6,542,305, describes a cover unit that opens and closes an opening in a vehicle for a display device that is readable at head height, wherein the opening permits the rays of an image transmitted from a display device to reach a screen, for example the windshield of the vehicle. The cover unit includes a shielding plate to block or unblock the geometric optical path from the display device to the screen or windshield. The shielding plate can be moved between an upright and a horizontal position by means of a motor-driven pivot and/or lever mechanism.

SUMMARY OF THE INVENTION

It is therefore an object of the invention to provide an alternative arrangement with regard to the prior art that is simple and economical for opening and closing an opening in an interior trim piece of a vehicle.

For the purposes of the present specification, the normal direction of travel of a vehicle may be designated "−x" ("minus x"), the direction opposite its normal direction of travel may be designated "+x" ("plus x"), the direction in the horizontal plane perpendicular to the x-direction that is to the right when viewed in the normal direction of travel (−x) may be designated "+y," the direction in the horizontal plane perpendicular to the x-direction that is to the left when viewed in the normal direction of travel (−x) may be designated "−y," the direction looking upward in the vertical plane perpendicular to the x-direction may be designated "+z," and the direction looking downward in the vertical plane perpendicular to the x-direction may be designated "−z." This method of designating the spatial directions in Cartesian coordinates corresponds to the coordinate system generally used in the automotive industry. Moreover, terms such as "front," "back," "up," and "down," as well as terms with similar semantic content, including the terms "right" and "left," are used in the same way as they are typically used for identifying directions in a motor vehicle.

Taking as a starting point an arrangement for opening and closing an opening provided in a covering surface of an interior trim piece of a vehicle, in particular a motor vehicle, by means of a displaceable cover element, wherein the cover element is composed of a flat element and can be moved from a closed position, in which the cover element covers the opening, to an open position, in which displacement of the cover element uncovers the opening, and back again, the cover element can be movably supported on a frame element connected to the interior trim piece in such a manner that the frame element has two lateral supports that are orthogonal to a surface spanned by the frame element or by the opening that have opposing and mutually coaxial bearing lugs, in each of which a pivoted lever is supported at one end so as to pivot about a common first pivot axis, which pivoted levers are connected to one another and at the other end are swivel-mounted about a common second pivot axis in bearings of the cover element, and by the means that the cover element has two bearing blocks that are oriented toward the first pivot axis and in which a shaft is rotatably supported that is axially parallel to the first and second pivot axes and passes through the bearing blocks, wherein a first gear is arranged in a rotationally fixed manner at each of the free ends of the shaft, and wherein each of the first gears meshes with a first gear rack arranged on the lateral support.

The opening and closing of the opening can be accomplished solely through the pivoting motion of the pivoted levers. A raising motion of the cover element by means of complicated lever actions to open the opening, such as is favored by the prior art, can be dispensed with in the present case, since the cover element travels more or less along the frame element or the opening of the interior trim piece during the opening process.

Accordingly, the first gear racks are designed to be congruent to one another. With regard to the first gears that are rigidly attached to the shaft, and which in turn each mesh with a first gear rack facing in the direction of travel of the cover element, this results in synchronization of the two sides of the cover element. As the invention further provides, the bearings are provided at one end of the cover element when viewed in the direction of travel of the cover element, whereas in contrast, proceeding from the bearings, the bearing blocks are arranged offset by a certain distance from the other end of the cover element. In advantageous fashion, this measure can be used to predefine a rolling contour of the first gear racks or a travel path of the cover element, for example a curved travel path, which ensures, during the opening process, that the cover element drops below the covering surface sections of the interior trim piece that border the opening. In this respect, the first gear racks can be designed to be straight and/or curved, at least in sections. In order to further improve the positive guidance of the cover element that is already achieved by the first gear racks, there is, adjoining each first gear on the side facing the lateral support, a guide block, which can be rotationally symmetrical and rotates with the shaft and the first gears, which in turn is guided in a slide guide of the lateral support parallel to the first gear rack. The rotary motion of the rotationally symmetrical guide blocks counters any stick-slip effect that may arise, but at a minimum the stick-slip effect can be efficaciously reduced.

As an exemplary embodiment of the invention additionally provides, at least one pivoted lever can be in operative connection with a pivot drive. By means of the pivot drive, a rotary motion or pivoting motion of the pivoted levers is advantageously converted into a predominantly translational motion of the cover element operatively connected to the pivoted levers. Preferably, the pivot drive is composed of a motor, in particular an electric motor, fastened to the frame element, or a motor/transmission block, the motor shaft or output shaft of which has a second gear that meshes with a second gear rack located on the pivoted lever, wherein the second gear rack is composed of a sector of an internally toothed spur gear, and wherein the second gear rack is located in a region between the two ends of the pivoted lever. In order to prevent, or at a minimum to efficaciously reduce, adverse effects of any gear backlash that may be present, especially between the second gear and the second gear rack, at least one of the pivoted levers is designed to be spring-loaded in the direction of pivoting.

It is especially advantageous for the arrangement according to an embodiment of the invention to be suitable for installation in an interior trim piece in the form of a dashboard, a center console, or a rear shelf of a vehicle. With regard to the dashboard, the cover element of the arrangement according to the invention can cover a head-up display, for example. A head-up display can be, for example, an information display system in which the information is projected out of the dashboard and through an opening in the same into the field of view of the vehicle driver, for example onto a windshield or onto a separate so-called combiner screen of the vehicle. The observable geometrical optical path of the light rays is blocked or unblocked here by means of the cover element.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
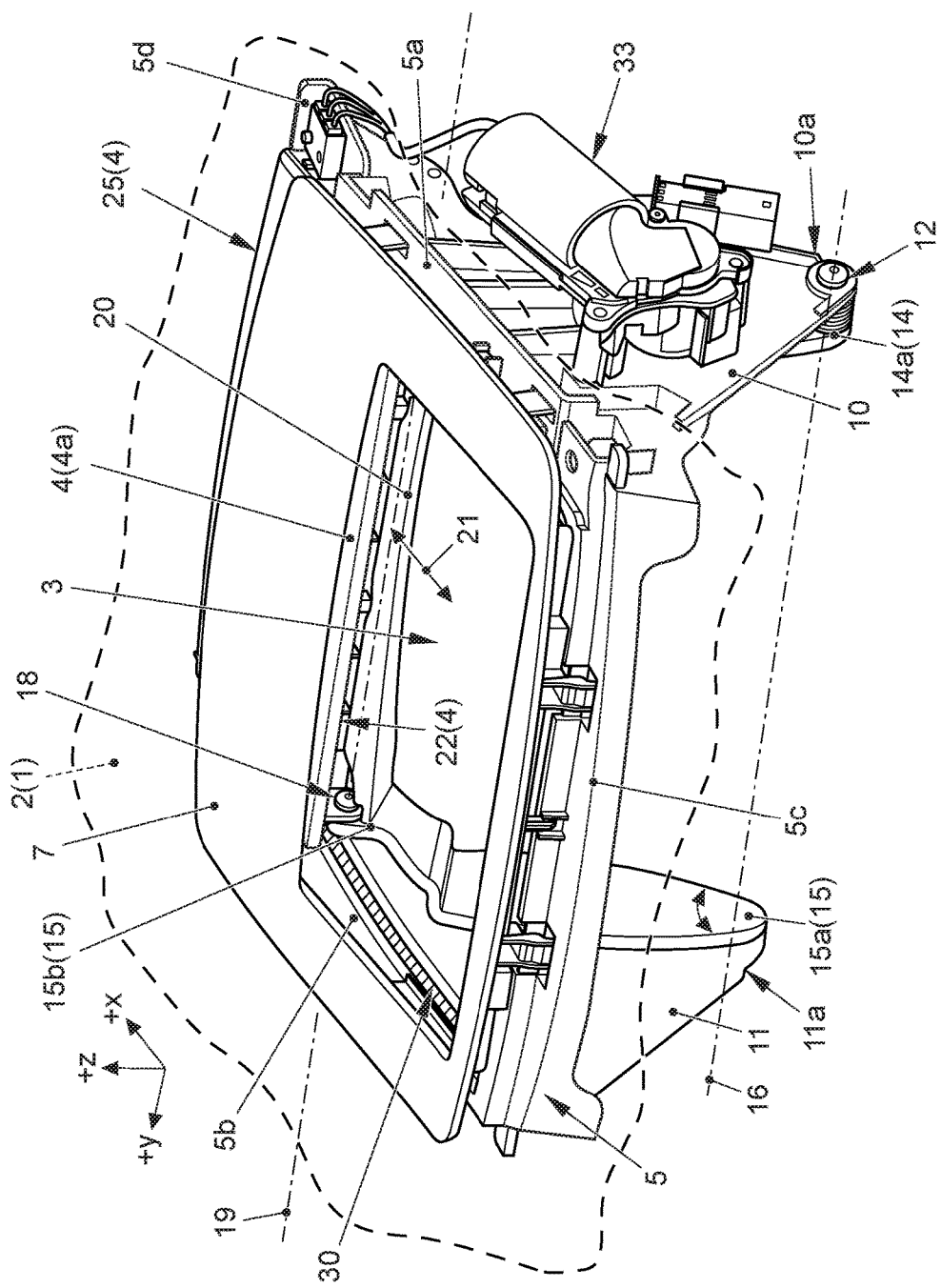
FIG. 1 shows a perspective top view of an interior trim piece of a vehicle with the arrangement according to the invention for opening and closing an opening in the interior trim piece according to an exemplary embodiment (opened opening)

FIG. 1 shows, firstly, a relevant section of an interior trim piece 1, by way of example in the present case a dashboard of a vehicle, for example, a motor vehicle. The interior trim piece 1 has an opening 3 in a horizontal or substantially horizontal top covering surface 2. However, the covering surface 2 need not be horizontal or substantially horizontal in its orientation, but instead can also deviate from the horizontal and/or can be curved in design.

According to this exemplary embodiment, the opening 3 ensures the optical path of the light rays produced by means of a head-up display that is not shown in the drawing. As already explained above, a head-up display is understood to be an information display system in which the information is projected out of the interior trim piece 1 or the dashboard of the vehicle and through the opening 3 in the same into the field of view of the vehicle driver, for example onto a windshield or onto a separate so-called combiner screen of the vehicle (not shown in the drawing). By means of a displaceable cover element 4 here, the geometrical optical path of the light rays can be blocked and unblocked, or the opening 3 can be closed and opened.

The cover element 4 is composed of a flat or substantially flat element and can be moved through travel thereof from an open position 4a, in which the cover element 4 uncovers the opening 3 (see FIGS. 1 and 2, in particular), to a closed position 4b, in which the cover element 4 occupies or covers the opening 3 (see FIG. 3-5, in particular), and back again. In the present case, the cover element 4 is movable in such a manner that, during the opening process, it moves more or less along the opening 3 and below the covering surface 2 of the interior trim piece 1 that borders the opening 3. In this process, the cover element 4 can be moved parallel to, at least in sections, or substantially parallel to the covering surface 2. To this end, the cover element 4 is movably supported on a frame element 5 that is rigidly connected to the interior trim piece 1, in the present case its covering surface 2.

The frame element 5 forms a rectangle that has two longitudinal struts 5a, 5b connected to one another by means of two transverse struts 5c, 5d. The longitudinal struts 5a, 5b are oriented in the longitudinal direction (X-direction) of the vehicle in this design. The frame element 5 additionally has so-called snap nuts 6 on the side facing the covering surface that serve to attach the frame element 5 to the interior trim piece 1 or to its covering surface 2 by means of mounting screws or the like, which are not shown in the drawing. In this design, the frame element 5 is placed against the covering surface 2 from below, and in this regard surrounds the opening 3.

In addition, a frame-like trim panel 7 is fastened to the frame element 5 from above, preferably through a catch mechanism, in particular so as to form a uniform surface together with the interior trim piece 1 or the dashboard. Furthermore, a stiffener 8 is also associated with the frame element 5; it extends between the longitudinal struts 5a, 5b at the back of the frame element 5 in the manner of a cross-beam, and is fastened thereto as an add-on component by means of mounting screws 9 (FIG. 3).

According to FIG. 1-6, the frame element 5 additionally has two lateral supports 10, 11 that are orthogonal to a surface spanned by the frame element 5 or by its longitudinal and transverse struts 5a-5d. Viewed in the transverse direction of the vehicle (Y-direction), the lateral supports 10, 11 are spaced apart from one another and are each joined at one end to a longitudinal strut 5a, 5b of the frame element 5, and are directed away from the covering surface 2 of the interior trim piece 1 proceeding from the frame element 5. It is preferred for the frame element 5, including the lateral supports 10, 11, to be implemented as a single piece, and further preferred for it to be made of a plastic using a plastic injection molding process. Each of the free or bottom ends 10a, 11a of the lateral supports 10, 11 has a bearing lug 12, 13. The bearing lugs 12, 13 are arranged to be coaxial to one another. In each of the bearing lugs 12, 13, a pivoted lever 14, 15 is supported at one end, or each at its bottom, first end 14a, 15a, so as to pivot about a common first pivot axis 16.

The pivoted levers 14, 15 are supported at the other end, or at their top, second ends 14b, 15b, in bearings 17, 18 of the cover element 4 so as to pivot about a common second pivot axis 19. Furthermore, the pivoted levers 14, 15 are rigidly connected to one another by means of a transverse strut 20, wherein the attachment of the pivoted levers 14, 15 to the bearings 17, 18 is accomplished indirectly through the transverse strut 20 in the present case. Preferably the pivoted levers 14, 15, including the transverse strut 20, are made of plastic as a single piece. It is further preferred for the bearings 17, 18 to be provided on a first, in the present case front, end 22 (−X) of the cover element 4 when viewed in the direction of travel 21 of the cover element 4 or in the longitudinal direction (±X-direction) of the vehicle (see FIG. 2, in particular).

Figure 3:
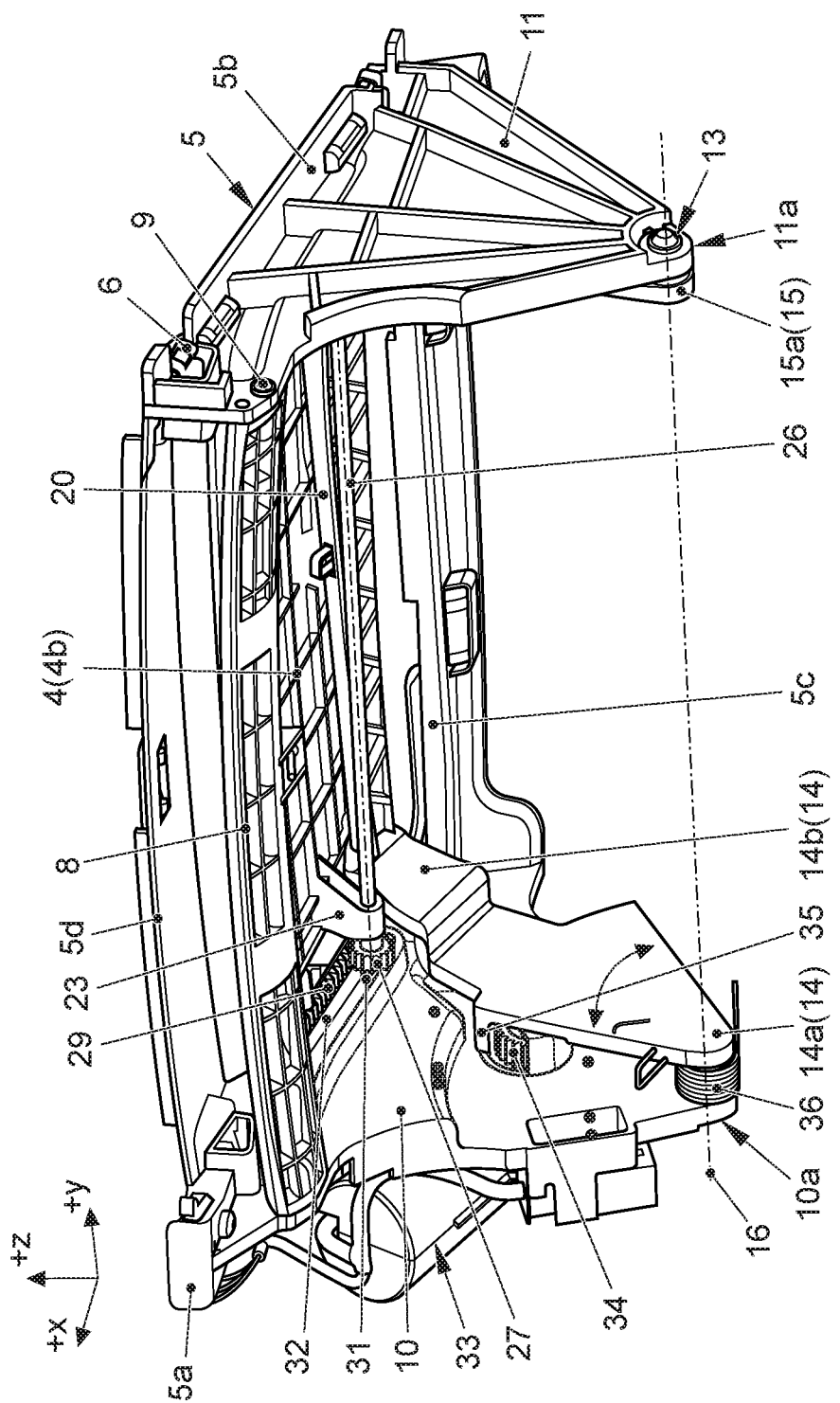
FIG. 3 shows the arrangement from FIGS. 1 and 2 in a perspective view from below with the opening closed according to an exemplary embodiment.
Figure 4:
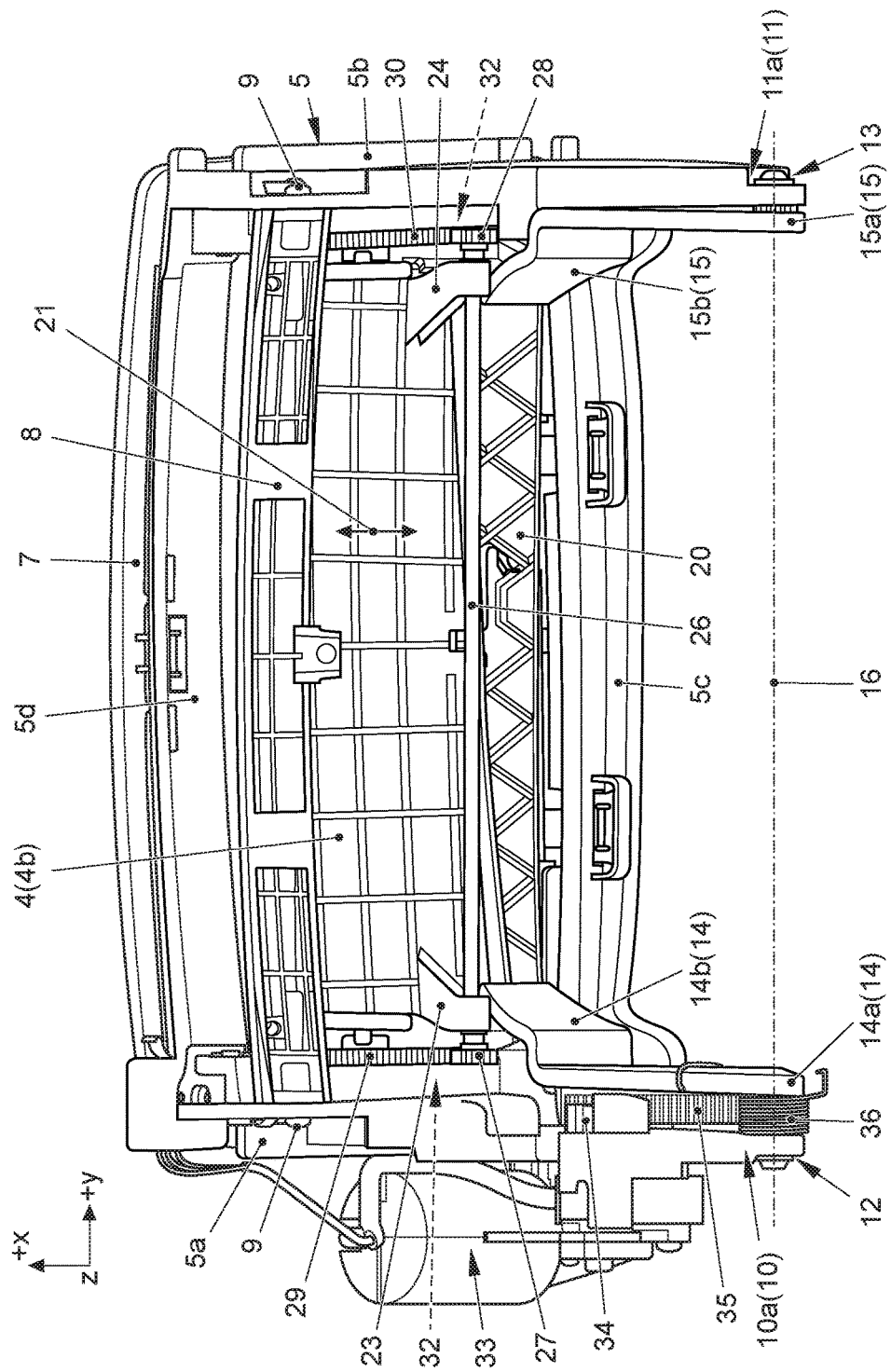
FIG. 4 is another view from below of the arrangement corresponding to the view from FIG. 3 (closed opening)
Figure 5:
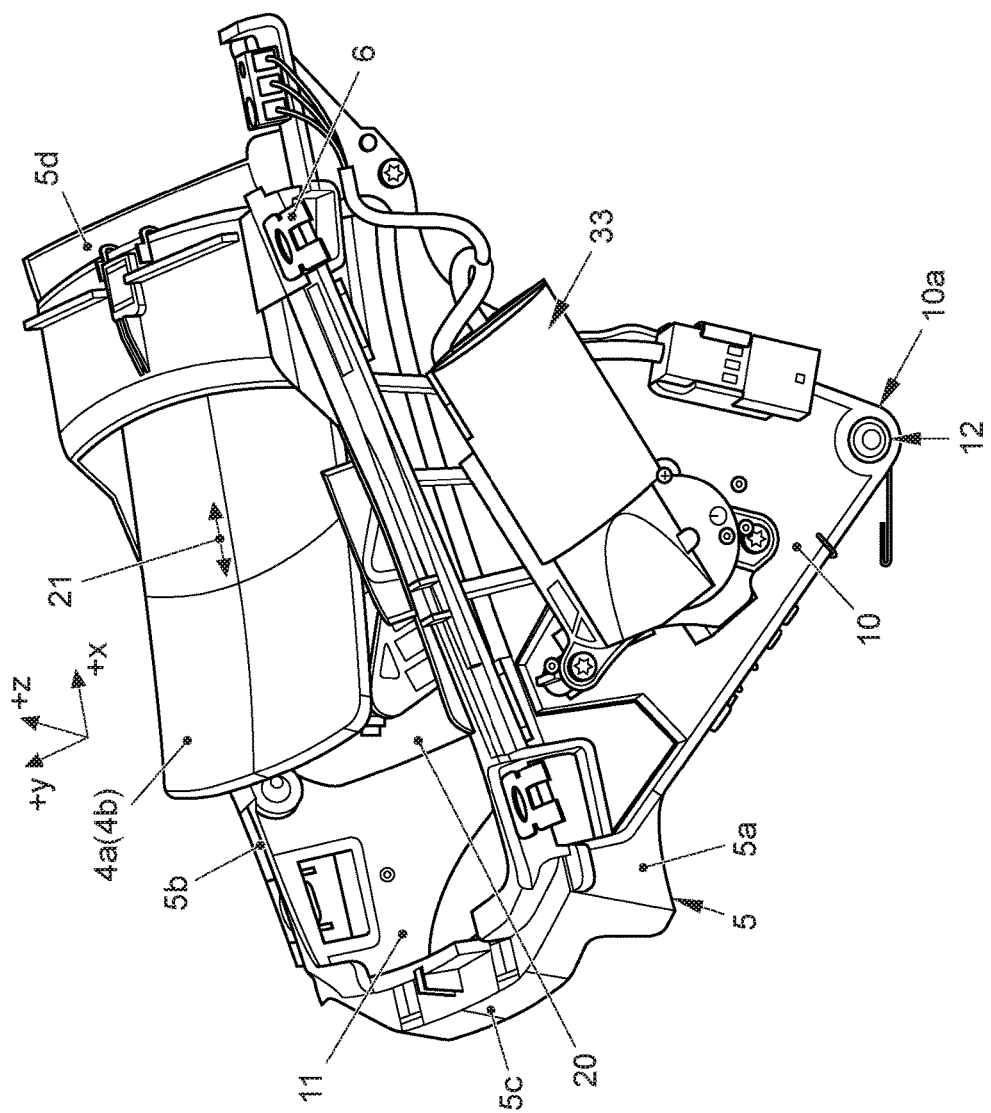
FIG. 5 shows the arrangement from FIG. 4 in a perspective top view.
Figure 6:
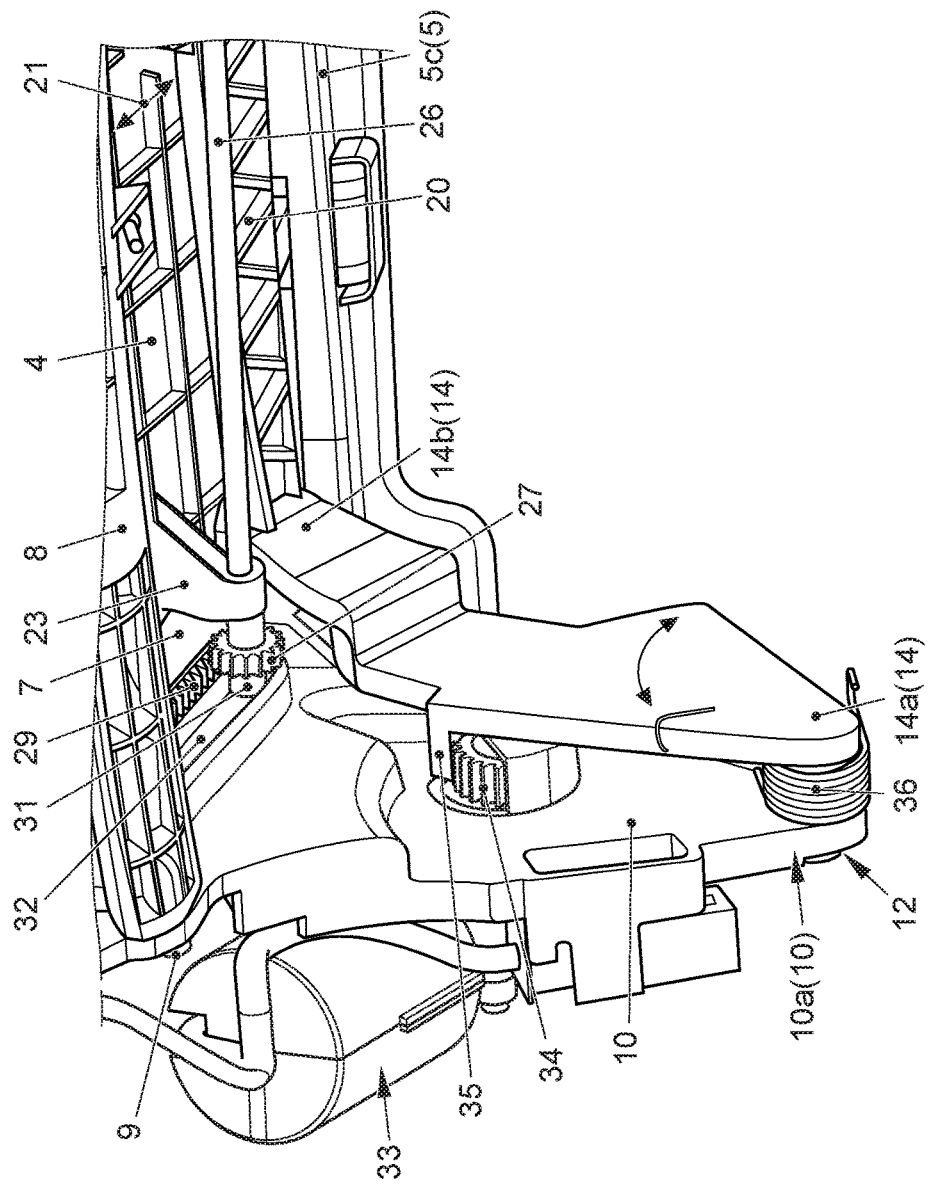
FIG. 6 is a perspective detail view of the elements of the arrangement that determine the kinematics of the cover element.

As is very clearly evident from FIGS. 3, 4, and 6, the cover element 4 has, viewed in the transverse direction (Y-direction) of the vehicle, two bearing blocks 23, 24 that are spaced apart from one another and are oriented toward the first pivot axis 16. Viewed in the direction of travel 21 of the cover element 4 or in the longitudinal direction (±X-direction) of the vehicle, and proceeding from the bearings 17, 18, the bearing blocks 23, 24 are arranged offset by a certain distance from a second, in the present case rear, end 25 (+X) of the cover element 4. Preferably the bearing blocks 23, 24 are implemented as a single piece with the cover element 4. A shaft 26 that is axially parallel to the first and second pivot axes 16, 19 and passes through the bearing blocks 23, 24 is rotatably supported in the bearing blocks 23, 24. A first gear 27, 28 is arranged in a rotationally fixed manner at each of the free ends of the shaft 26 (FIG. 4, in particular).

The first gears 27, 28 mesh with a first gear rack 29, 30 located on the applicable lateral support 10, 11. Preferably the first gear racks 29, 30 are implemented as a single piece with the lateral supports 10, 11, for example are molded onto the lateral supports 10, 11 during the aforementioned plastic injection molding process.

As can be seen from FIG. 4, in particular, the first gear racks 29, 30 are designed to be congruent to one another. With regard to the first gears 27, 28 that are rigidly attached to the shaft 26, this results in synchronization of the two sides of the cover element 4.

Figure 2:
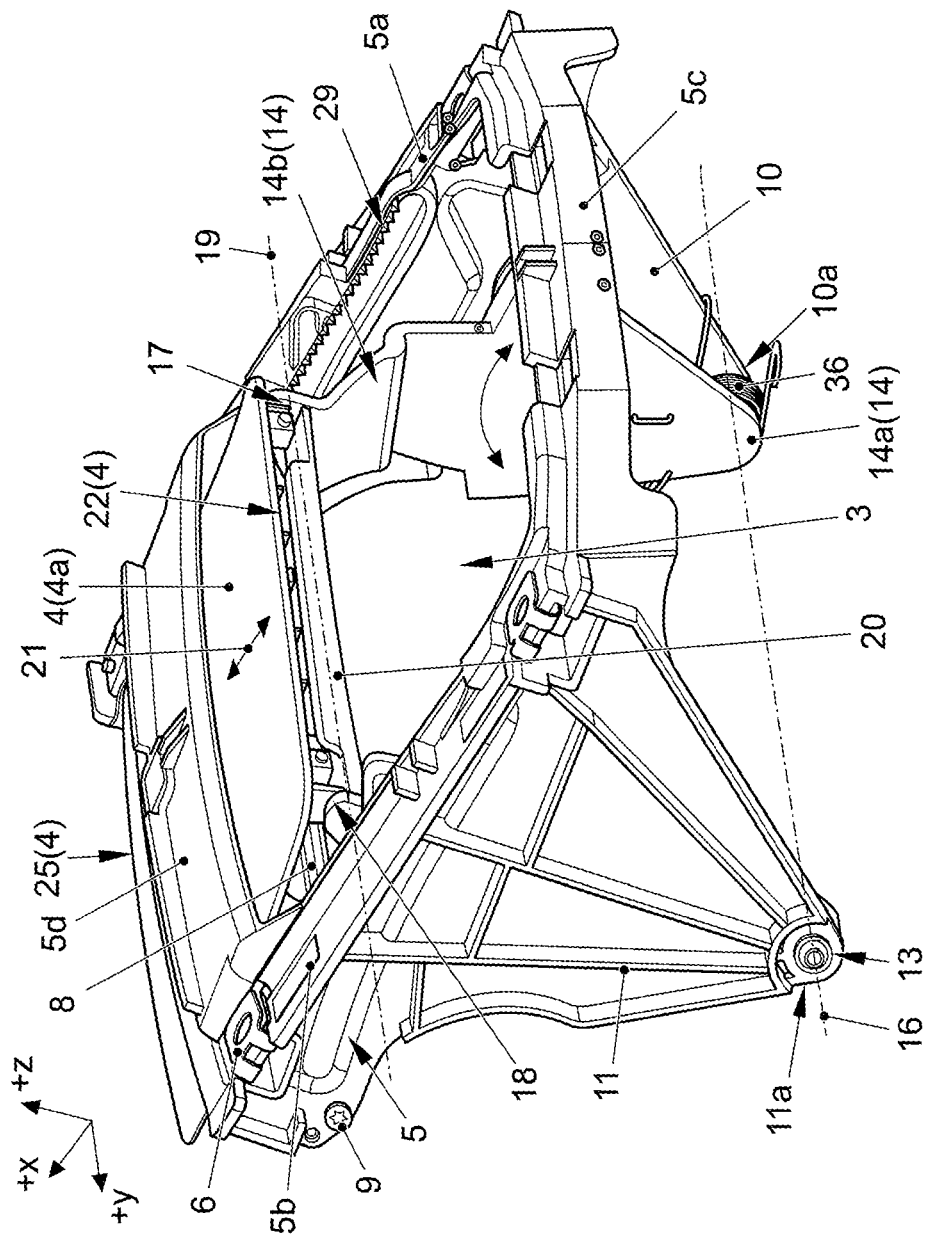
FIG. 2 shows the arrangement in another perspective view, rotated by approximately 180° about a vertical axis (opened opening)

As can be seen from FIGS. 2, 3, and 6, in particular, the first gear racks 29, 30 can be designed to be straight and/or curved, at least in sections. In advantageous fashion, this measure can be used to predefine a rolling contour of the first gear racks 29, 30 or a travel path of the cover element 4, for example a curved travel path, which ensures, during the opening process, that the cover element 4 drops below the sections of the covering surface 2 of the interior trim piece 1 that border the opening 3.

FIGS. 1 and 2 show a first variant embodiment of the first gear racks 29, 30 to the effect that the teeth of the same face upward and the first gears 27, 28 engage or are placed in the teeth more or less from above.

In contrast, FIG. 3-6 show a second variant embodiment of the first gear racks 29, 30 such that the teeth of the same face downward and the first gears 27, 28 engage or are placed in the teeth more or less from below. In order to further improve the positive guidance here of the cover element 4 that is already achieved by the first gear racks 29, 30, there is, adjoining each first gear 27, 28 on the side facing the lateral support 10, 11, a guide block 31, which preferably is rotationally symmetrical and rotates with the shaft 26 and the first gears 27, 28, which in turn is guided in a slide guide 32 of the applicable lateral support 10, 11 (FIGS. 3 and 6). The slide guides 32 in this design are parallel to the first gear rack 29, 30. The rotary motion of the rotationally symmetrical guide blocks 31 counters any stick-slip effect that may arise, but at a minimum the stick-slip effect can be efficaciously reduced. The slide guides 32 preferably are formed as a single piece with the associated lateral support 10, 11.

To bring about the travel of the cover element 4 in one direction or the other (±X-direction), at least one of the pivoted levers 14, 15, in the present case the left-hand pivoted lever 14 viewed facing forward in the vehicle (−X-direction), is in operative connection with a pivot drive 33. By means of the pivot drive 33, a rotary motion or pivoting motion of the interconnected pivoted levers 14, 15 is advantageously converted into a predominantly translational motion of the cover element 4 operatively connected to the pivoted levers 14, 15.

The pivot drive 33 is composed of a motor, in particular an electric motor, fastened to the frame element 5, or a motor/transmission block. In the present case, a motor/transmission block is shown as the pivot drive 33. Its output shaft, not visible, passes through the lateral support 10 associated with the pivoted lever 14 from the outside. As shown in FIGS. 3, 4, and 6, a second gear 34 is arranged at the free end of the output shaft in a rotationally fixed manner. The second gear 34 meshes with a second gear rack 35 located on the pivoted lever 14. In this design, the second gear rack 35 is composed of a sector of an internally toothed spur gear, and is preferably formed as a single piece with the pivoted lever 14. Furthermore, in the present case the second gear rack 35 is located in an approximately central region between the two ends 14a, 14b of the pivoted lever 14.

In order to prevent, or at a minimum to efficaciously reduce, adverse effects of any gear backlash that may be present, especially between the second gear 34 and the second gear rack 35, at least one of the pivoted levers 14, 15 is designed to be spring-loaded in the direction of pivoting. In the present case, a preloaded coil spring 36 that bears against the lateral support 10 at one end and against the pivoted lever 14 at the other end is located on the pivoted lever 14.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An arrangement comprising:
a displaceable cover element adapted to open and close an opening provided in a covering surface of an interior trim piece of a vehicle, wherein the cover element is composed of a flat element and is movable from a closed position, in which the cover element covers the opening, to an open position, in which displacement of the cover element uncovers the opening, and back again; and
a frame element movably supporting the cover element, the frame element being connectable to the interior trim piece such that the frame element has two lateral supports that are orthogonal to a surface spanned by the frame element or by the opening and that have opposing and mutually coaxial bearing lugs in each of which a pivoted lever is supported at one end so as to pivot about a common first pivot axis, which pivoted levers are connected to one another and at the other end are swivel-mounted about a common second pivot axis in bearings of the cover element,
wherein the cover element has two bearing blocks that are oriented toward the first pivot axis and in which a shaft is rotatably supported that is axially parallel to the first and second pivot axes and passes through the bearing blocks,
wherein a first gear is arranged in a rotationally fixed manner at each of the free ends of the shaft, and
wherein each of the first gears meshes with a first gear rack arranged on the lateral support.

2. The arrangement according to claim 1, wherein the first gear racks are congruent to one another.

3. The arrangement according to claim 1, wherein the bearings are provided at one end of the cover element when viewed in the direction of travel of the cover element, and wherein, proceeding from the bearings, the bearing blocks are arranged offset by a certain distance from the other end of the cover element.

4. The arrangement according to claim 1, wherein sections of the first gear racks are straight or curved.

5. The arrangement according to claim 1, wherein, adjoining each first gear on the side facing the lateral support, a guide block is arranged that is guided in a slide guide of the lateral support parallel to the first gear rack.

6. The arrangement according to claim 1, wherein at least one pivoted lever is in operative connection with a pivot drive.

7. The arrangement according to claim 6, wherein the pivot drive comprises a motor fastened to the frame element or a motor/transmission block, the motor shaft or output shaft of which has a second gear that meshes with a second gear rack located on the pivoted lever, wherein the second gear rack is composed of a sector of an internally toothed spur gear, and wherein the second gear rack is arranged in a region between two ends of the pivoted lever.

8. The arrangement according to claim 1, wherein at least one of the pivoted levers is spring-loaded in a direction of pivoting.

9. The arrangement according to claim 1, wherein the interior trim piece is a dashboard, a center console, or a rear shelf of the vehicle.

10. The arrangement according to claim 1, wherein the arrangement is adapted to cover a heads-up display.

* * * * *